(12) United States Patent
De-Tullio

(10) Patent No.: US 10,308,080 B2
(45) Date of Patent: Jun. 4, 2019

(54) CIVIL ENGINEERING TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Murielle De-Tullio, Clermont-ferrand (FR)

(73) Assignees: Compagnie Generale Des Etablissements Michelin, Clermont-Ferrand (FR); Michelin Recherche Et Technique, Granges-Paccot (CH)

( * ) Notice: Subject to any disclaimer, the term of this patent is extended or adjusted under 35 U.S.C. 154(b) by 659 days.

(21) Appl. No.: 14/771,345

(22) PCT Filed: Feb. 20, 2014

(86) PCT No.: PCT/EP2014/053360
§ 371 (c)(1),
(2) Date: Aug. 28, 2015

(87) PCT Pub. No.: WO2014/131692
PCT Pub. Date: Sep. 4, 2014

(65) Prior Publication Data
US 2016/0009145 A1    Jan. 14, 2016

(30) Foreign Application Priority Data
Feb. 28, 2013  (FR) ..................... 13 51801

(51) Int. Cl.
*B60C 11/11* (2006.01)
*B60C 11/13* (2006.01)
*B60C 11/03* (2006.01)

(52) U.S. Cl.
CPC .......... *B60C 11/1315* (2013.01); *B60C 11/11* (2013.01); *B60C 11/1307* (2013.01);
(Continued)

(58) Field of Classification Search
CPC ............ B60C 11/1315; B60C 11/1307; B60C 11/0311; B60C 2011/0365
See application file for complete search history.

(56) References Cited

U.S. PATENT DOCUMENTS

| | | | |
|---|---|---|---|
| 3,830,275 A * | 8/1974 | Russell .................. | B29D 30/52 152/209.18 |
| 2006/0102267 A1* | 5/2006 | Takahashi ........... | B60C 11/0306 152/209.18 |
| 2007/0199633 A1 | 8/2007 | Hayashi | |
| 2012/0006456 A1 | 1/2012 | Koshio | |
| 2013/0206299 A1 | 8/2013 | Yoda | |

FOREIGN PATENT DOCUMENTS

| | | |
|---|---|---|
| EP | 1759890 A1 | 3/2007 |
| EP | 2390113 A1 | 11/2011 |

(Continued)

OTHER PUBLICATIONS

Machine translation for Japan 2001-180227 (Year: 2017).*

(Continued)

*Primary Examiner* — Steven D Maki
(74) *Attorney, Agent, or Firm* — Dickinson Wright PLLC

(57) ABSTRACT

Tread for a civil engineering tire, provided with circumferential grooves and transverse grooves, having two edge rows provided with a plurality of blocks, which in pairs delimiting a groove of transverse overall orientation opening both onto a circumferential groove and to the outside of the tread, each block having a contact face to contact the ground, two lateral faces—an external lateral face and an internal lateral face, a front face and a rear face, intersecting the contact face along a front edge corner and a rear edge corner, the blocks formed such that their external lateral faces lie the same distance
(Continued)

from an equatorial plane that divides the tread into two equal halves wherein the width of the transverse grooves increases progressively at least from a non-zero distance measured from a plane parallel to the equatorial plane through the axially outermost points of the external lateral faces of the blocks wherein the maximum increase in width of a transverse groove is at least equal to 20% and at most equal to 50% of the maximum circumferential length Lc of each block.

11 Claims, 2 Drawing Sheets

(52) U.S. Cl.
CPC ... *B60C 11/0311* (2013.01); *B60C 2011/0365* (2013.01); *B60C 2200/065* (2013.01)

(56) References Cited

FOREIGN PATENT DOCUMENTS

| | | | |
|---|---|---|---|
| JP | 01-178007 A | * | 7/1989 |
| JP | 2001-180227 A | * | 7/2001 |
| JP | 2005-247153 A | * | 9/2005 |
| WO | 2012053227 A1 | | 4/2012 |

OTHER PUBLICATIONS

Machine translation for Japan 2005-247153 (Year: 2018).*
Machine translation for Japan 01-178007 (Year: 2018).*
International Search Report for Priority Application PCT/EP2014/053360 dated Jun. 5, 2014.

* cited by examiner

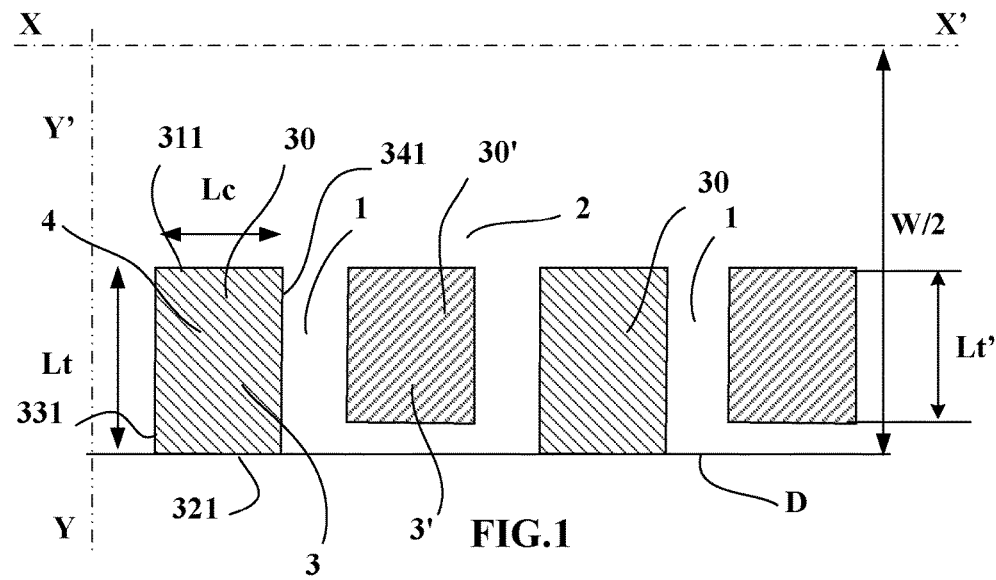
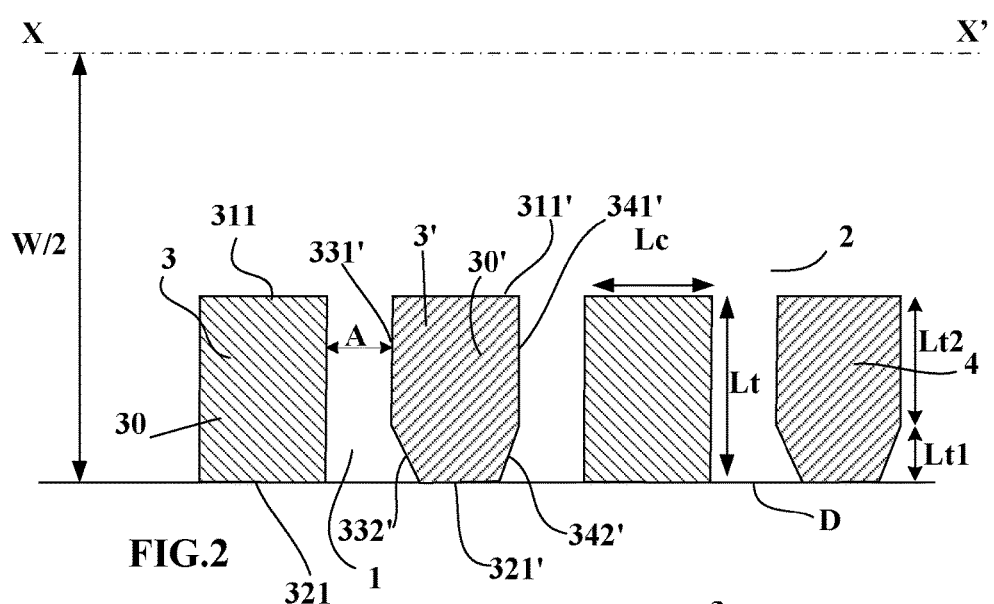
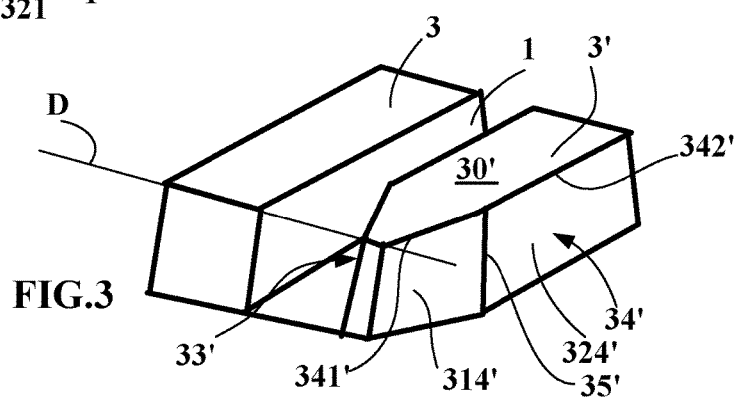

CIVIL ENGINEERING TIRE TREAD

This application is a 371 national phase entry of PCT/EP2014/053360, filed 20 Feb. 2014, which claims benefit of French Patent Application No. 1351801, filed February 2013, the entire contents of which are incorporated herein by reference for all purposes.

BACKGROUND

Field

The disclosure relates to a tire tread for a civil engineering vehicle (of "off-road" type), this tread having a tread pattern capable of clearing earth better while at the same time maintaining good properties of grip and wear.

Of the uses to which civil engineering tires are put, a notable distinction is made of the use to which articulated dump truck tires are put. This use is very specific because it requires the vehicles to have a good ability to cover soft and uneven terrain.

Description of Related Art

Usually, a tire intended to be fitted to a civil engineering vehicle is provided with a tread surmounting radially on the outside a crown reinforcement which itself surmounts a carcass reinforcement. This tread has a tread pattern formed of raised elements (ribs or blocks) these raised elements being delimited by a plurality of grooves.

The raised elements of the tread have faces—referred to as contact faces—radially on the outside of the tread, which are intended to come into contact with the ground. The grooves have depths at most equal to the thickness of the tread and have geometries, when viewed in cross section, suited to limiting the retention of stones and other objects present on the ground and which may become trapped in the said grooves.

When driving over soft ground (soil, mud), the grooves fill with soil and this may prove detrimental to traction. It is therefore necessary for these grooves having become filled when they form the contact patch to be able to be rid of this soil so that they exhibit suitable grip and traction. What happens is that the grooves remain filled with soil as they next form the contact patch so that it becomes difficult to bite into the ground again in order to develop traction. The traction of the vehicle is thereby reduced in consequence.

One solution to this problem has already been implemented on tires intended notably to run on soft ground. With this solution, a tire comprises a tread provided with a plurality of grooves of circumferential and transverse orientation, these grooves delimiting a plurality of blocks among which can be distinguished two rows of blocks that form the edges of the tread, these rows being axially furthest towards the outside on each side of the tread. This solution involves offsetting one of the lateral faces of one block in two of the edge rows of blocks axially inwards. By thus creating a space axially on the outside of one edge block it has been found that it is possible to eject the soil that may have entered the grooves in the contact patch in which the groove is in contact with the ground on which the tire is being driven.

This solution, effective though it may be, still has a limit on grip and traction because it reduces the length of entry edge corner in the contact patch of one block in two.

The object of embodiments of the invention is to propose a solution to the problem that has just been outlined, namely to produce a tread pattern for a tire of a civil engineering vehicle of the articulated dump truck type, for which the ability to clear the mud or soil trapped in the transverse grooves between the blocks of the edge rows is improved, without however disturbing the longitudinal grip and traction of the vehicle.

Definitions

A block is a raised element formed on a tread, this element being delimited by voids or grooves and comprising a contact face, this contact face being intended to come into contact with the ground during running, lateral faces and a front and rear face. Each block of the edge rows of the tread comprises an axially external lateral wall and an axially internal lateral wall, the latter facing a circumferential groove. The two lateral faces are spaced apart in the transverse direction by a maximum distance that corresponds to the transverse width of the block. A front face and a rear face can be distinguished, these being referred to respectively as the leading face and the trailing face, these faces delimiting transverse grooves. These leading and trailing faces intersect the contact face, respectively, along a leading edge corner and a trailing edge corner. The leading edge corner corresponds to the edge corner that is first to enter the contact patch as the tire is being driven on.

An edge corner that is active when the tire is new in this document means an edge corner that is present on the running surface of the tread when the tread is new.

A rib is a raised element formed on a tread, this element extending in the circumferential direction and making a circuit of the tire. A rib comprises two lateral walls and a contact face, the latter being intended to come into contact with the roadway during driving.

A radial direction means a direction perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

The usual running conditions of the tire or conditions of use are those defined in Europe by the E.T.R.T.O. standard; these conditions of use specify the reference inflation pressure which corresponds to the load bearing capability of the tire as indicated by its load rating and speed code. These conditions of use may also be referred to as "nominal conditions" or "usage conditions".

SUMMARY

One subject of the invention is a tread for a civil engineering vehicle tire, this tread made of rubber being provided with circumferential grooves and transverse grooves, these grooves having a depth and a width and delimiting a plurality of raised elements forming a tread surface and notably comprising two edge rows of the tread each of which is provided with a plurality of blocks axially bounding the tread over a maximum axial width corresponding to the contact width in the conditions of use. The blocks of each edge row of the tread in pairs delimit a groove of transverse overall orientation opening both onto a circumferential groove and to the outside of the tread.

Each block of the edge rows comprises a contact face intended to come into contact with the ground, two lateral faces—an external lateral face and an internal lateral face, as well as a front face and a rear face, these front and rear faces being spaced apart in the circumferential direction, the front face and the rear face intersecting the contact face along a front edge corner and a rear edge corner respectively. The blocks of each edge row are formed in such a way that their external lateral faces all lie the same distance from an equatorial plane that divides the tread into two tread halves of equal width.

The tread has a maximum axial width which corresponds to the maximum axial distance between the external lateral faces of the blocks of the edge rows.

The tread according to an embodiment of the invention is such that the width of the transverse grooves between the blocks of the edge rows, this width being measured on the tread surface, when new, increases progressively at least from a non-zero distance measured from a plane parallel to the equatorial plane and passing through the axially outermost points points of the external lateral faces of the blocks of the edge rows of the tread.

This tread is characterized in that, with each block of edge rows having a maximum circumferential length Lc, the maximum increase in width of the transverse groove (1) is at least equal to 20% of this maximum circumferential length Lc and at most equal to 50% of this maximum circumferential length Lc.

Below 20%, the effect is not pronounced enough, whereas above 50%, the stiffness of the block may find itself affected—which means to say reduced—as a result, to the point of increasing the wear rate.

A groove of transverse overall orientation in this document means a groove the direction of which is not circumferential, which means to say does not make a circuit of the tire when the tread according to the invention is part of a tire. A transversely oriented groove may therefore be oriented transversely or alternatively make an angle greater than zero degrees with the transverse direction. In practice, this angle makes at most 45 degrees with the transverse direction.

By virtue of an embodiment of the invention it is possible to make the edges of the tread work under favourable conditions on muddy ground while at the same time allowing the material picked up between the blocks in the edge region of the tread to be cleared regularly.

According to one alternative form that is easy to implement, the increase in width of the transverse grooves between the blocks of the edge rows is linear and increasing in the direction of the outside of the edge row.

Advantageously, on at least one block in two of the edge rows at least the front edge corner or the rear edge corner comprises a rectilinear part that is inclined with respect to the axial direction at an angle at least equal to 5° and at most equal to 30°, this inclined rectilinear part meeting the external lateral face of the block.

According to another advantageous alternative form, the variation in width of the transverse grooves between the edges of the edge rows is such that, on the tread as new, at least the front edge corner or the read edge corner of a block follows a curvilinear path from a non-zero distance measured from the axial limit of the tread and up to the axial limit of the tread.

For preference, the distance, from which the width transverse grooves between the blocks of the edge rows increases, is at least equal to 10 mm and at most equal to 50% of the axial length of an edge block, this length being measured in the axial direction between the axially furthermost points of the said block. The distance is measured with respect to the axially outermost points of the contact face.

In another advantageous alternative form of the invention, it is advantageous to combine any one of the above arrangements with undercut angles of the faces of the blocks of the edge rows such that the total length of edge corners on the contact face of the blocks increases with tread wear.

In order to obtain a significant increase in edge corner length as the tread gradually wears away, it is possible to make provision for at least one lateral face to duplicate starting from the contact face when new.

It has been found that an embodiment of the invention is particularly well suited to treads of great thickness and notably thickness in excess of 38 mm (thickness means the maximum height of material that can be worn away during running).

Further features and advantages of the invention will become apparent from the description given hereinafter with reference to the attached drawings which, by way of non-limiting examples, show alternative forms of embodiment of the subject matter of the invention.

BRIEF DESCRIPTION OF THE FIGURES

FIG. 1 is a plan view of part of an edge of a tread according to the prior art;

FIG. 2 is a plan view of part of an edge of a tread according to a first embodiment of the invention;

FIG. 3 is a perspective local view of the alternative form shown in FIG. 2;

DETAILED DESCRIPTION OF SPECIFIC EMBODIMENTS

Figure 4:
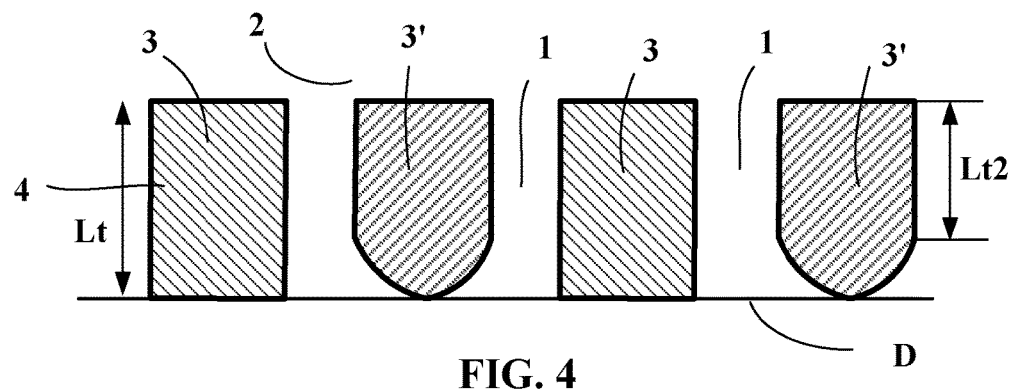
FIG. 4 is a plan view of part of an edge of a tread according to a second embodiment of the invention.

In the figures that accompany this description, the same reference symbols are used to describe alternative forms of the invention where these reference signs refer to elements of a similar kind, whether this be from a structural or alternatively a functional, standpoint.

FIG. 1 is a plan view of just part of an edge row of a tread according to the prior art. According to this prior art, transverse grooves 1 delimit with a circumferential groove 2 a plurality of blocks 3 which, on an edge of the tread, form an edge row 4. The blocks 3, 3' of this row are spaced apart in the circumferential direction. The blocks 3, 3' depicted here each have a transverse length Lt or Lt' respectively, these lengths being measured in the transverse direction indicated by the line YY' and have the same circumferential length Lc measured in the circumferential direction indicated by the line XX'. This line XX' also embodies the line of the mid-plane that divides the tread into two tread halves of equal width W/2.

A straight line D in this FIG. 1 indicates the maximum axial limit of the tread surface of the tread. Each block 3, 3' comprises a respective contact face 30, 30' intended to come into contact with the ground during running, this contact face 30, 30' being delimited by edge corners formed by the intersection of the contact face with lateral faces of the said block 3, 3'. Each block comprises a front face and a rear face, these front and rear faces being separated from one another in the circumferential direction by a distance Lc, and two lateral faces, an internal lateral face delimiting the circumferential groove 2 and an external lateral face axially on the outside of the tread.

The front face of a block and the rear face of an adjacent block of the same row delimit a transverse groove 1 opening both into the circumferential groove 2 and to the outside of the tread.

During running it has been found that the transverse grooves 1 could become filled with material such as mud and that the presence of this material led to a lack of traction because it is no longer possible to bite into the ground with raised elements in order to shear the ground next time that region becomes the contact patch. In order to be able to clear out material present in these transverse grooves it is known practice, as shown with the alternative form in FIG. 1, to reduce the transverse length of one block in two. Certain blocks 3 have their external lateral face ending at the line D and have a transverse length Lt whereas other blocks 3' have a transverse length Lt' shorter than Lt. The latter blocks at 3' end axially towards the inside with respect to the line D, which means to say towards the midplane of the tread embodied by the line XX'.

Thanks to this arrangement it is possible to clear out the material trapped in each transverse groove of the edge row during running; however, that can be done only at the expense of grip because there is a reduction in the length of the front and rear edge corners (which means to say of the transversely oriented edge corners) of one block in two when new.

The invention as carried out in a first alternative form of embodiment shown in FIG. 2 makes it possible to obtain good clearance of muddy materials that may be stored in the transverse grooves while at the same time regaining a greater length of transverse edge corners.

With this first alternative form, the blocks 3 of the edge rows 4 of a tread for a tire of a civil engineering vehicle all have the same transverse length Lt and are delimited by transverse grooves 1 and a circumferential groove 2. These grooves all have the same depth.

In this first alternative form, a plurality of blocks 3 each comprise a contact face 30 and four lateral faces and are of parallelepipedal shape. These blocks 3 of parallelepipedal shape have a contact face 30 delimited by edge corners 311 and 321, these edge corners being oriented in the direction XX'. These same blocks have front and rear edge corners 331, 341, these edge corners being perpendicular to the direction XX'.

Interposed between two blocks 3 of parallelepipedal shape is a truncated block 3' comprising six lateral faces intersecting a contact face 30'. Among the lateral faces of a truncated block 3' may be found an internal lateral face delimiting the circumferential groove 2 and an external lateral face of which the intersection with the contact face forms an edge corner situated the same distance W/2 away from the mid-plane XX' as the external lateral face of the blocks 3 of parallelepipedal shape.

The truncated blocks 3' have an internal lateral face intersecting the contact face 30' along two lateral edge corners 311', 321' which are parallel to the circumferential direction (direction indicated by the line XX'). Furthermore, each truncated block 3' comprises front and rear lateral faces each of which intersects the contact face 30' along an edge corner formed of two segments, 331', 332' and 341', 342', respectively.

Each segment 331', 332' (341', 342', respectively) of these edge corners makes a different and non-zero angle with the axial direction. A first segment 331', 341' begins at the edge corner 311' that the internal lateral face makes with the contact face, making an angle of 90 degrees with the axial direction, and a second segment 332' 342' extends the first segments, respectively, making an angle of 15 degrees with the axial direction. These second segments 332', 342' start at a distance Lt1 measured from the straight line D that connects the edge corners formed by the external lateral faces with the contact faces.

The geometry of the truncated blocks 3' allows a transverse groove 1 to be delimited with a parallelepipedal block 3 of which transverse groove the width A—measured in the circumferential direction—is constant over a transverse length Lt2 starting from the circumferential groove 2 delimiting the said blocks and increases linearly over a length Lt1 as far as the axially outermost points of the truncated blocks 3' (these points are situated on a straight line D shown in FIG. 2).

In the case set out here, the variation in width of each transverse groove is linear and increases with increasing proximity to the straight line D. If the maximum circumferential length of each of the blocks 3, 3' is denoted Lc, the increase in width of a transverse groove is equal to 30% of the maximum circumferential length Lc.

For preference, the angle of inclination of the edge corner part between Lt1 and Lt is taken to be at least equal to 5° and at most equal to 30°.

The front edge corners 331' and rear edge corners 332' of the blocks 3' of the edge rows of the tread contribute during running to the circumferential grip over a length at least equal to that of the front and rear edge corners of the other blocks 3.

The edge corner 321' formed by the intersection of the external lateral face with the contact face of the truncated blocks 3' has a circumferential length that is reduced in comparison with the circumferential length of the edge corner 311' formed by the intersection of the internal lateral face with that same contact face.

While FIG. 2 shows only the tread surface when new, it goes without saying that the increase in width of the transverse grooves 1 also has an effect on practically the entire depth of the said grooves even when the lateral faces are formed with non-zero undercut angles (an undercut is to be understood here to mean that the front and rear faces of a block make an angle other than 90 degrees with the contact face of this block).

It is preferable for the circumferential width of the transverse grooves to increase over at least 50% of the depth of the groove so as to maintain effective clearance of material likely to be picked up inside the said grooves during running.

The tread variant shown in FIG. 2 has no preferred direction of running.

FIG. 3 shows a perspective local view of the alternative form shown in FIG. 2. This FIG. 3 shows a block 3 of parallelepipedal shape and a truncated block 3' separated by a groove 1. Each truncated block 3' has a front lateral face 33' and a rear lateral face 34' each formed with two elementary faces making an angle between them, in this case an angle of less than 180 degrees. The lateral rear face 34' is formed of two facets 314' and 324' which intersect along an edge corner 35'.

In this first alternative form, each block has a maximum circumferential length Lc and the maximum increase in a transverse groove width (measured at the axially external end on the line D) is at least equal to 20% of the maximum circumferential length Lc and at most equal to half the circumferential length Lc.

FIG. 4 shows a plan view of an edge part of a tread according to a second embodiment of the invention. This FIG. 4 readopts the arrangement of blocks 3, 3' of the edge row 4 that is shown in FIG. 2, altering the form of the front face and of the rear face of the truncated blocks 3' arranged so that they alternate with parallelepipedal blocks 3. In this alternative form, the front face and the rear face are planar starting from the circumferential groove 2 and over a transverse length Lt2 that is shorter than the total transverse length Lt, then become curves so that the width of the transverse grooves 1 increases. These curved parts of the front and rear faces meet tangentially at the transversely outermost point of each truncated block 3'. The straight line D passes through the axially outermost points of the blocks 3, 3' of the edge row.

In all the embodiments described, the variation in transverse groove width has been obtained by choice by altering the geometry of one block in two: it is of course quite simple to achieve this variation in groove width by making similar changes to all the blocks of the edge rows.

In the present description, the terminology "front face, rear face" of a block has been used for the sake of convenience although the tread according to the invention is intended to be the tread of a tire intended to run and therefore to have a direction of running. Of course it is easy for a person skilled in the art to choose—if the tread pattern does have a preferred direction of running—which face needs to be modified in order to obtain the variation in groove width necessary for good clearing of the materials that may become trapped in the said groove.

In an alternative form of embodiment that has not been depicted, the variation in groove width may increase evenly over the entire length Lt of the said groove.

Figure 5:
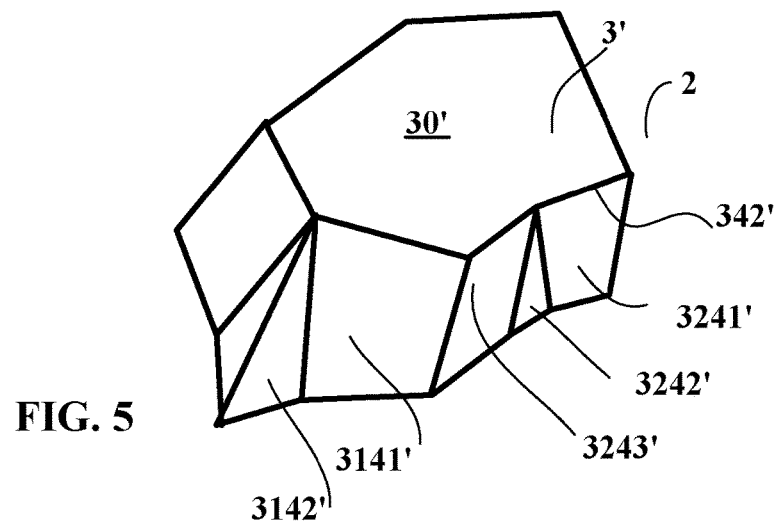
FIG. 5 is a perspective local view of an edge block according to a fourth alternative form of embodiment of the invention.

FIG. 5 shows a perspective local view of a truncated block 3' of an edge row according to a third alternative form of embodiment of the invention.

In this third alternative form of embodiment that allows a grip to improve with wear, aside from increasing the width of each transverse groove, each front and rear face of the truncated blocks 3' duplicates from the contact face when new so that the total length of the edge corners of the contact face of the blocks increases very significantly as tread wear increases. In the part visible in this FIG. 5, the lateral face delimiting with another block a transverse groove is broken down into several facets 3241', 3242', 3243', the intermediate facet 3242' being triangular in shape with the vertex situated on the contact face 30' when new. The part of the block over which the width of the transverse groove increases is formed of two facets 3141' and 3142', the latter being of triangular shape with a vertex situated on the contact face 30' when new.

This invention in the form of the first alternative form of embodiment set out in the present document has been employed on a tread of a civil engineering tire of size 800/80 R 29. This tread is provided with a tread pattern comprising four circumferential rows of blocks delimited by circumferential grooves and transverse grooves, two edge rows and two intermediate rows. The wearable thickness of material in this instance is 38 mm, which corresponds more or less to the depth of the grooves. By virtue of the invention, a significant improvement in traction and grip were observed, with the wear rate performance being entirely satisfactory.

While the invention has been described in general terms and by means of a small number of alternative forms, it should be understood that this invention is not restricted only to these alternative forms described and depicted.

What is claimed is:

1. A tread for a civil engineering tire, this tread made of rubber being provided with circumferential grooves and transverse grooves,
   wherein these circumferential and transverse grooves have a depth and a width and delimit a plurality of raised elements forming a tread surface and comprising two edge rows of the tread,
   wherein each edge row is provided with a plurality of blocks axially bounding the tread over a maximum axial width corresponding to the contact width in conditions of use,
   wherein the blocks of each edge row of the tread, in pairs, delimit a groove of transverse overall orientation opening both onto a circumferential groove and to an outside of the tread,
   wherein each block of the edge rows comprises:
   a contact face adapted to come into contact with a ground surface,
   two lateral faces—comprising an external lateral face and an internal lateral face,
   a front face and a rear face, wherein these front and rear faces are spaced apart in the circumferential direction, and wherein the front face and the rear face intersect the contact face along a front edge corner and a rear edge corner respectively,
   wherein the blocks of each edge row are formed in such a way that their external lateral faces all lie the same distance from an equatorial plane that divides the tread into two tread halves of equal width,
   wherein the tread has a maximum axial width between axial limits of the tread corresponding to the maximum axial distance between the external lateral faces of the blocks of the edge rows,
   wherein the width of the transverse grooves between the blocks of the edge rows, this width being measured on the tread surface, increases progressively at least from a non-zero distance measured from a plane parallel to the equatorial plane and passing through the axially outermost points of the external lateral faces of the blocks of the edge rows of the tread,
   wherein, with each block having a maximum circumferential length Lc, the maximum increase in width of the transverse groove is at least equal to 20% of this maximum circumferential length Lc and at most equal to 50% of this maximum circumferential length Lc, and
   wherein every other block in each edge row defines a parallelepiped shape.

2. The tread according to claim 1, wherein the increase in width of the groove is linear and increasing in the direction of an outside of the edge row.

3. The tread according to claim 2, wherein on at least one block in two of the edge rows at least the front edge corner or the rear edge corner comprises a segment that is inclined with respect to the axial direction at an angle at least equal to 5° and at most equal to 30°, this inclined segment meeting the external lateral face of the block.

4. The tread according to claim 1, wherein the variation in width of the transverse grooves between the edge corners of the edge rows is such that, on the tread as new, at least the front edge corner or the rear edge corner of a block follows a curvilinear path from a non-zero distance measured from the axial limit of the tread and up to the axial limit of the tread.

5. The tread according to claim 4, wherein the distance, from which the width of the transverse grooves between the blocks of the edge rows increases, is at least equal to 10 mm and at most equal to 50% of the axial length of an edge block, this axial length of the edge block being measured in the axial direction between the axially outermost point of the edge block and the axially innermost point of the edge block.

6. The tread according to claim 1, wherein the total length of edge corners on the contact face of the blocks between the blocks defining the parallelepiped shape of the edge rows increases with tread wear.

7. The tread according to claim 1, wherein the tread thickness is at least equal to 38 mm.

8. The tread according to claim 1, wherein each of the external lateral faces and each of the internal lateral faces are parallel to the equatorial plane.

9. The tread according to claim 8, wherein the front face of each block disposed between the blocks defining a parallelepiped shape include a first front segment and the rear face of each block disposed between the blocks defining a parallelepiped shape include a first rear segment and wherein the first front segment and first rear segment extend from the external lateral face at oblique angles with respect to the axial direction.

10. The tread according to claim 9, wherein the front face of each block disposed between the blocks defining a parallelepiped shape include a second front segment and the rear face of each block disposed between the blocks defining a parallelepiped shape include a second rear segment and wherein the second front segment and second rear segment extend perpendicularly from the internal lateral face to the respective first front segment and first rear segment.

11. The tread according to claim 1, wherein the width of the transverse grooves increases evenly over an entire length of the groove.

* * * * *